(12) United States Patent
Borah

(10) Patent No.: US 7,984,456 B2
(45) Date of Patent: Jul. 19, 2011

(54) INTERCEPTOR FRAMEWORK USING JAVA DYNAMIC PROXIES

(75) Inventor: Gautam Borah, Bangalore (IN)

(73) Assignee: Ketera Technologies Inc., Santa Clara, CA (US)

( * ) Notice: Subject to any disclaimer, the term of this patent is extended or adjusted under 35 U.S.C. 154(b) by 818 days.

(21) Appl. No.: 12/035,453

(22) Filed: Feb. 22, 2008

(65) Prior Publication Data

US 2009/0138893 A1 May 28, 2009

(30) Foreign Application Priority Data

Nov. 23, 2007 (IN) .................................... 2749/07

(51) Int. Cl.
*G06F 3/00* (2006.01)
(52) U.S. Cl. ........................ 719/328; 719/330
(58) Field of Classification Search .................. 719/328, 719/330
See application file for complete search history.

(56) References Cited

U.S. PATENT DOCUMENTS

| 7,444,536 | B1 * | 10/2008 | Jairath | ............................ | 714/4.11 |
| 2007/0189509 | A1 * | 8/2007 | Foody et al. | ...................... | 380/2 |
| 2008/0270986 | A1 * | 10/2008 | Simeonov et al. | ............. | 717/120 |

OTHER PUBLICATIONS

Hana K. S. Rubinsztejn, A Framework for building customized adaption proxies, 2002.*

* cited by examiner

*Primary Examiner* — Lechi Truong
(74) *Attorney, Agent, or Firm* — Ash Tankha; Lipton, Weinberger & Husick

(57) ABSTRACT

Disclosed herein is a method and system for isolating business logic from system operations by attaching and organizing a set of java interceptor components, using XML configuration and java dynamic proxy functionality, around an existing standard software java business component. The interceptor components are configured by pre-configuring a set of interceptor classes in an XML configuration file. An interceptor framework is provided which configures, initializes and maintains the interceptor classes. A proxy of the business component is created and returned to a calling client program. The interceptor framework parses the XML configuration file for initializing all the interceptor classes. An interceptor chain is created associated with the business component, when the client program invokes the methods on the proxy business component. Each interceptor acts as a proxy to a previous interceptor in the interceptor chain.

11 Claims, 8 Drawing Sheets

```
<invocation-handler-root>
    <invocation-handler-factory>
        <invocation-handler-factory-class-name> com.ketera.invoice.service.proxy.factory.CxmlInvoiceProcessing
Factory
        </invocation-handler-factory-class-name>
        <invocation-handler-list>
            <invocation-handler>
                <invocation-handler-class-name> com.ketera.invoice.service.invoice.handler.InvoiceBusinessVali
dationHandler
                </invocation-handler-class-name>
            </invocation-handler>
            <invocation-handler>
                <invocation-handler-class-name> com.ketera.invoice.service.invoice.handler.CxmlPORefValidation
Handler
                </invocation-handler-class-name>
            </invocation-handler>
            <invocation-handler>
                <invocation-handler-class-name> com.ketera.invoice.service.invoice.handler.PoAssociationHandler
                </invocation-handler-class-name>
            </invocation-handler>
        </invocation-handler-list>
    <invocation-handler-factory>
<invocation-handler-root>
```

FIGURE 5

```
        try{
                InvoiceProxyService proxy =
InvoiceProxyFactory.getInvoiceProxyService();
                proxy.createInvoice(session, invoiceCtx);
        }catch(Exception e){
                log.error(e);
                throw new InvoiceBusinessException(e.getMessage());
        }
```

FIGURE 6

```
public class CxmlInvoiceProcessingFactory extends BaseProxyFactory {
    private static boolean init = false;
    private static InvoiceProxyService proxy = null;

public static final InvoiceProxyService
getInvoiceProxyService() throws InvoiceBusinessException{
        if(!init){
            synchronized(CxmlInvoiceProcessingFactory.class){
                if(!init){
                    InvoiceProxyService invoiceProxyService
= new InvoiceProxyServiceImpl();

proxy = (InvoiceProxyService)
getInstance(
                                invoiceProxyService,
    "com.ketera.invoice.service.proxy.factory.CxmlInvoiceProcessing
Factory");
                    init = true;
                }
            }
        }
        return proxy;
    }
}
```

FIGURE 7

INTERCEPTOR FRAMEWORK USING JAVA DYNAMIC PROXIES

BACKGROUND

This invention in general relates to proxy interceptor components and specifically relates to arranging java interceptor components in a plug and play mode using extensible markup language (XML) configuration and Java® dynamic proxies over an existing java business component such that the underlying business logic is separated from the system operations.

Business components are primarily written for addressing business functionalities. The software business components encapsulate the business logic. These business components are deployed in a Java server environment that provides system functionalities like transaction management, security management, etc. For example an enterprise java bean (EJB) component is deployed in an application server environment that provides the system functionalities. The business components, i.e. the EJB components encapsulating the business logic, depend on the application server's system functionalities to complete business objectives. The business components depend on the application server's transaction service to manage its transactions and the application server's security services to provide security. The naming service of the application server may expose the business component, in which case the business component may be accessed as remote components by external systems.

In order to avoid exposing underlying business logic or other data layers, a business component needs to be made independent of the server environment in which the business component is deployed. The system functionalities and environment functionalities need to be outside the scope of a business component. Furthermore, it is desirable if the components that provide the system functionalities could be organized, i.e. added and/or removed, around an existing business component in a plug and play mode.

Existing methods employ interceptors to intercept communication between a client program and the business components. However, the need to organize the interceptor components and separate the business logic from the system functionalities is unaddressed.

In view of the foregoing discussion, there is an unaddressed need for separating business logic from system functionalities in an environment and minimizing the dependence of these business components on the system functionalities.

SUMMARY OF THE INVENTION

Disclosed herein is a method and system that addresses the above mentioned needs for isolating business logic from system operations by attaching and organizing interceptor components around a business component. The interceptor components are configured by pre-configuring a set of interceptor classes in a configuration file. An interceptor framework is provided that configures, initializes and maintains the interceptor classes. A proxy of the business component is created and returned to a calling client program. The interceptor framework parses the configuration file for initializing all the interceptor classes. An interceptor chain associated with the business component is created using java dynamic proxies, based on the number of interceptors initialized in the interceptor framework. Each interceptor acts as a proxy to a previous interceptor in the interceptor chain.

The interceptor framework enables the organization of dynamic proxy interceptors over a business component that is deployed in a java virtual machine (JVM) or any other virtual machine that supports generation of dynamic proxies. The interceptor classes are configured in a predefined file that is sent as an input to the framework. The framework reads the predefined file and initializes all the interceptor classes and creates an interception chain around the business component. The technique of creating an interception chain without modifying the business component is the highlight of the invention. The approach is to isolate the common system functionalities from the business functionalities.

Java® dynamic proxies provide a means to create wrapper classes on the fly, wherein the wrapper classes act as interceptors over a business component. The proxy wrappers isolate the business logic from the system operations they perform such as maintaining transaction integrity, authentication, performance matrix calculation, etc.

The interceptor components are arranged and may be configured to operate in a plug and play mode. Depending on the system requirements, an interceptor component, providing the desired system functionality may be added on or removed from an existing business component. The order of the interception, in a list of interceptors, may be changed, without changing the business component. A client program need not be aware of the interceptors and may directly call the interface methods published by the business component. When the client program executes any of the exposed methods on the interface published by the business component, the framework dynamically initializes the interceptors around the business components.

The interceptor framework is a Java® software framework. This Java framework initializes the individual interceptor components and creates a chain of interceptors based on the configuration in the configuration file. Generated interceptor components are interposed between the client program and the business component such that the client program is unaware of the separation of the business logic and the system functionalities in the business component.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary constructions of the invention; however, the invention is not limited to the specific methods and instrumentalities disclosed.

FIG. 5 illustrates an exemplary application programming interface (API) to configure the interceptor classes in the framework.

FIG. 6 illustrates an exemplary API to derive proxy reference to the business component.

FIG. 7 illustrates an exemplary API for initializing a business component from a factory.

DETAILED DESCRIPTION OF THE INVENTION

Figure 1:
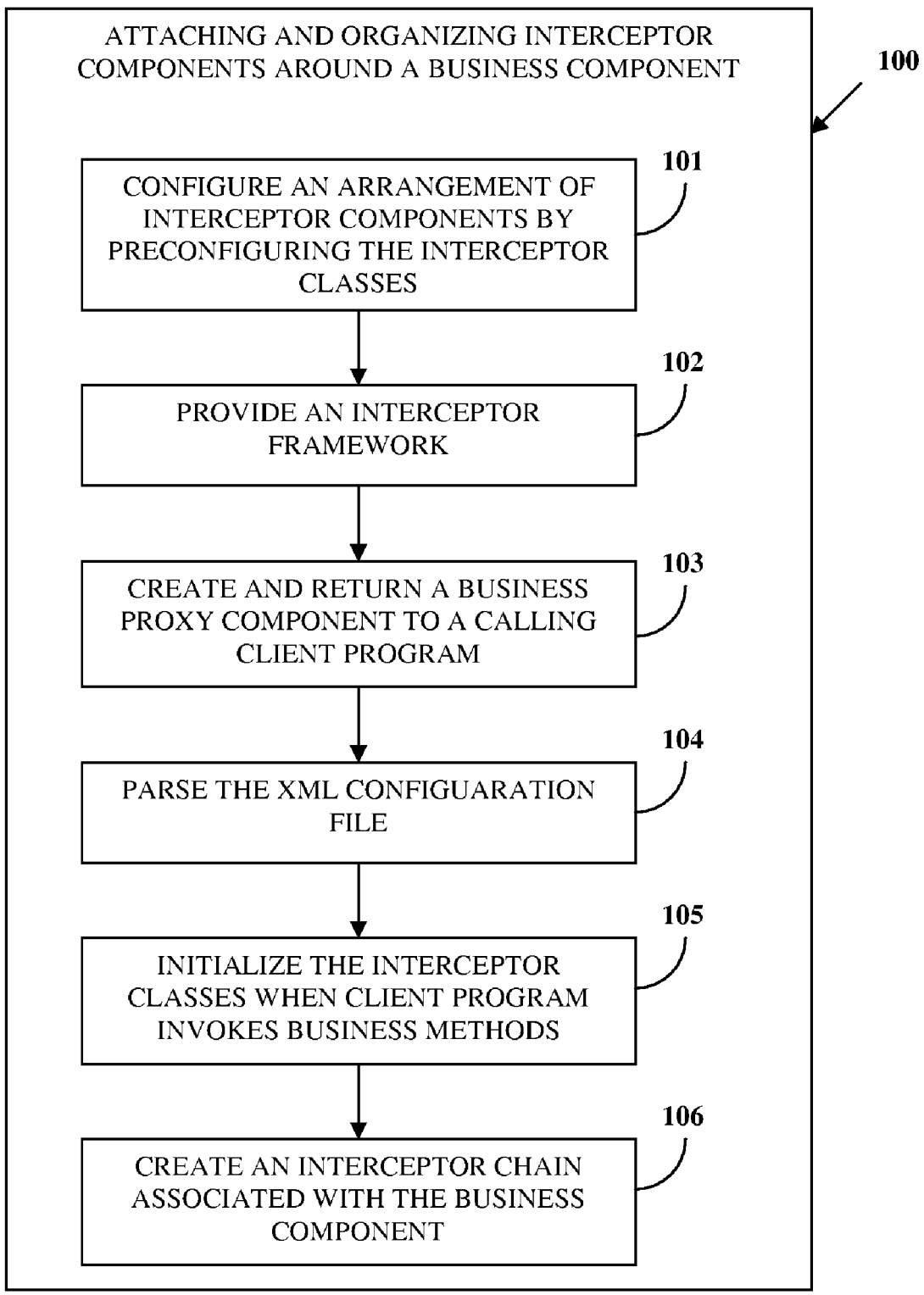
FIG. 1 illustrates a method of isolating business logic from system operations.

FIG. 1 illustrates a method of isolating business logic from system operations. The step of isolating business logic from system operations comprises the step of attaching and organizing 100 interceptor components 204 around a business component 203. The arrangement of interceptor components 204 are configured 101 by pre-configuring a set of interceptor classes in an XML configuration file 201. The XML configuration file 201 may be one of extensible markup language (XML) file, a standard generalized markup language file, and an extensible hypertext markup language file. For the purpose of illustration an XML configuration file 201 is considered herein. An interceptor framework 202 is provided 102 to configure, initialize, and maintain the interceptor classes. When a client program calls a business component, the interceptor framework 202 parses 104 the XML configuration file 201 for initializing 105 the interceptor classes and creates a chain of interceptors. The chain is attached to the business component and a proxy of the business component is created and returned 103 to the client program. The interceptor components are created as instances of the interceptor classes during the initialization of these interceptor classes.

An interceptor chain associated with the business component 203 is created 106 using java dynamic proxies, based on the number of interceptor components 204 initialized in the interceptor framework 202. Each interceptor component 204 acts as a proxy to a previous interceptor component in the interceptor chain. The interceptor components 204 are interposed between a client program and the business component 203. The interceptor components 204 perform various system functionalities without any dependence on the business logic of the business component 203. The business component 203 is thus rendered independent of the system functionalities. The system functionalities include security services, transactional services, remote services, Java naming and directory interface (JNDI) services, etc. The proxy interceptors isolate the business component 203 from the system operations such as maintaining transaction integrity, authentication and performance matrix calculation, etc.

Using the interceptor framework 202 a set of java interceptor classes is automatically initialized over a business component 203 in a plug and play mode. An interceptor component 204 may be introduced, removed and/or replaced over a business component 203. The order of the intercept calls may be changed by configuring the changes in the standard XML document referred to as the XML configuration file 201. The interceptor framework 202 may configure, initialize, and maintain the wrapper/interceptor classes in a plug and play environment. The client programs that access the business components 203 are rendered unaware of the interceptors and when the client program executes any of the exposed methods on the interface published by the business component 203, the framework delegates method calls to the interceptors preconfigured in the XML configuration file 201.

Figure 2:
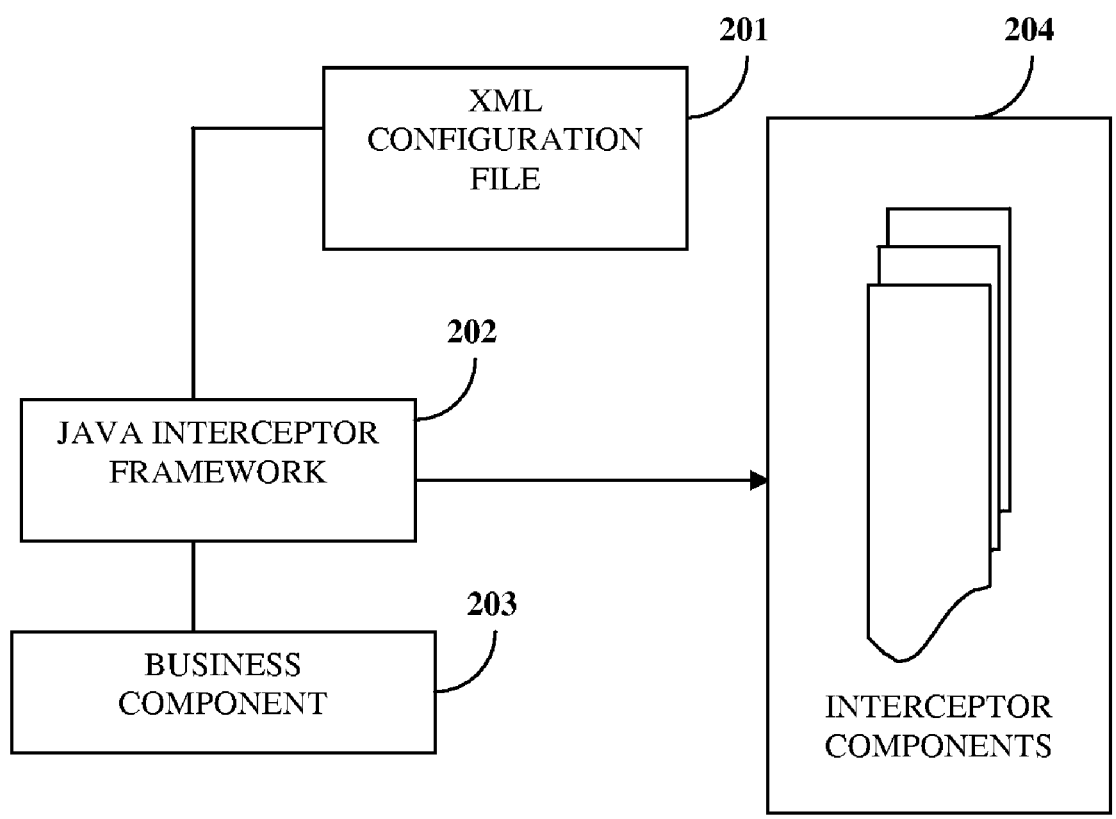
FIG. 2 illustrates the different components involved in the interceptor framework.

FIG. 2 illustrates the different components involved in the interceptor framework 202. The XML configuration file 201 comprises preconfigured interceptor classes. The XML configuration file 201 is given as an input to the interceptor framework 202. The interceptor framework 202 initializes the interceptor classes by parsing the XML configuration file 201. The interceptor components 204 are attached and organized around the business component 203 according to the needs of any business environment, and dynamically arranged when a client program invokes the business components 203. The interceptor framework 202 manages the life cycle of the interceptor components 204. The interceptor framework 202 may be deployed in a Java virtual machine or any virtual machine that supports generation of dynamic proxies.

The interceptor framework 202 has standard published application programmer interfaces (APIs) that needs to be implemented by the intended wrapper/interceptor classes. The behavior of the interceptor classes are described in the abstract base class com.ketera.invoice.service.proxy.BaseHandler.

The abstract methods in the base class that needs to be implemented by all the interceptor classes that are used in the interceptor framework 202, are given below:

protected abstract void preInvoke(Object proxy, Method method, Object[ ] args) throws InvoiceBusinessException;

protected abstract void postInvoke(Object proxy, Method method, Object[ ] args) throws InvoiceBusinessException;

The interceptor framework 202 comprises a configuration factory that is a software component. The configuration factory is used by the interceptor framework 202 to read an XML configuration file 201 that contains the list of interceptors for a business component 203. The configuration factory initializes each of interceptor components 204 after reading the XML configuration file 201 and creates an interceptor chain. The responsibility of the configuration factory also includes attaching the interceptor chain to a business component 203.

Figure 3A:
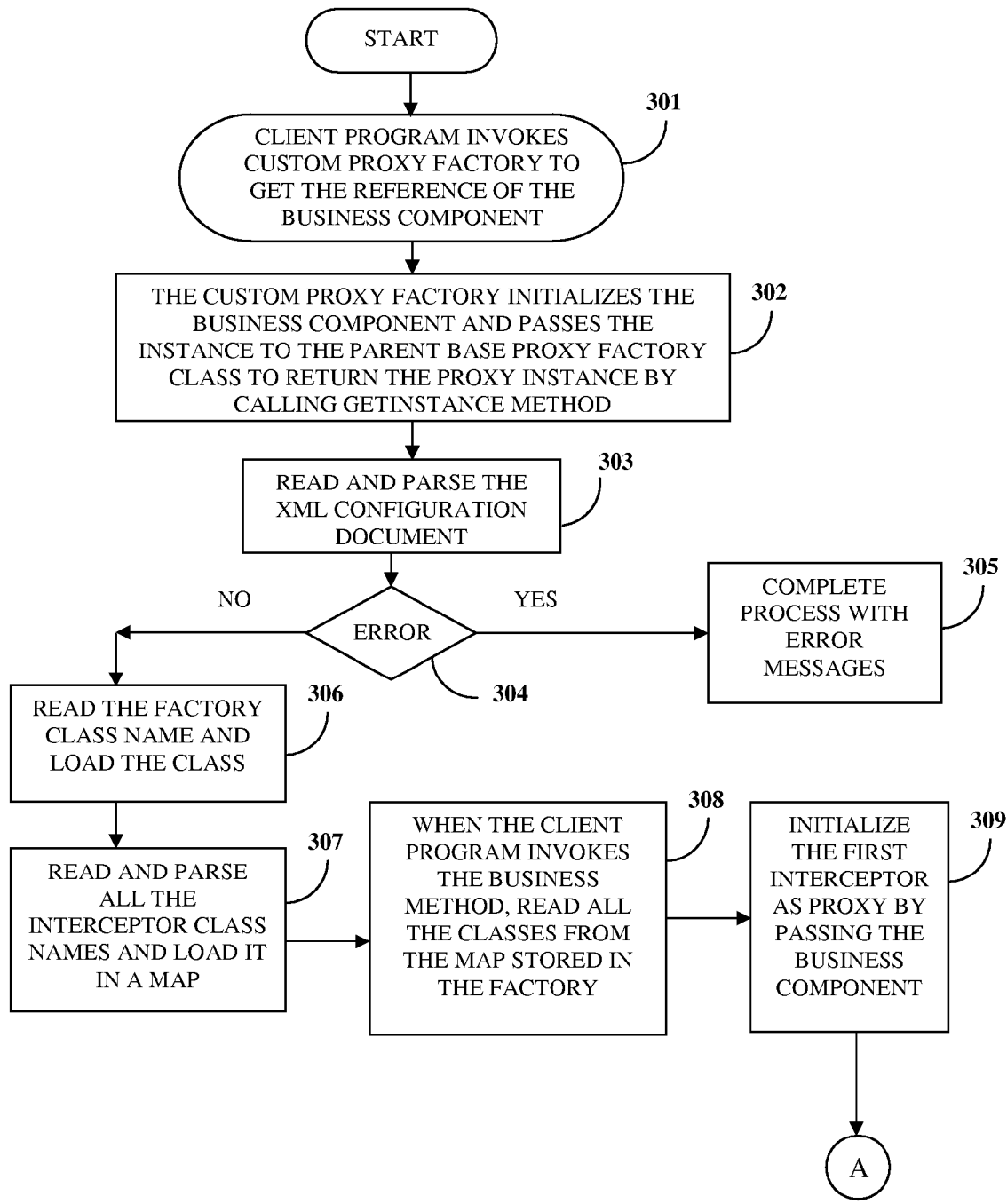
FIG. 3A illustrates a process flow-chart describing the processes involved in initializing the interceptor components.
Figure 3B:
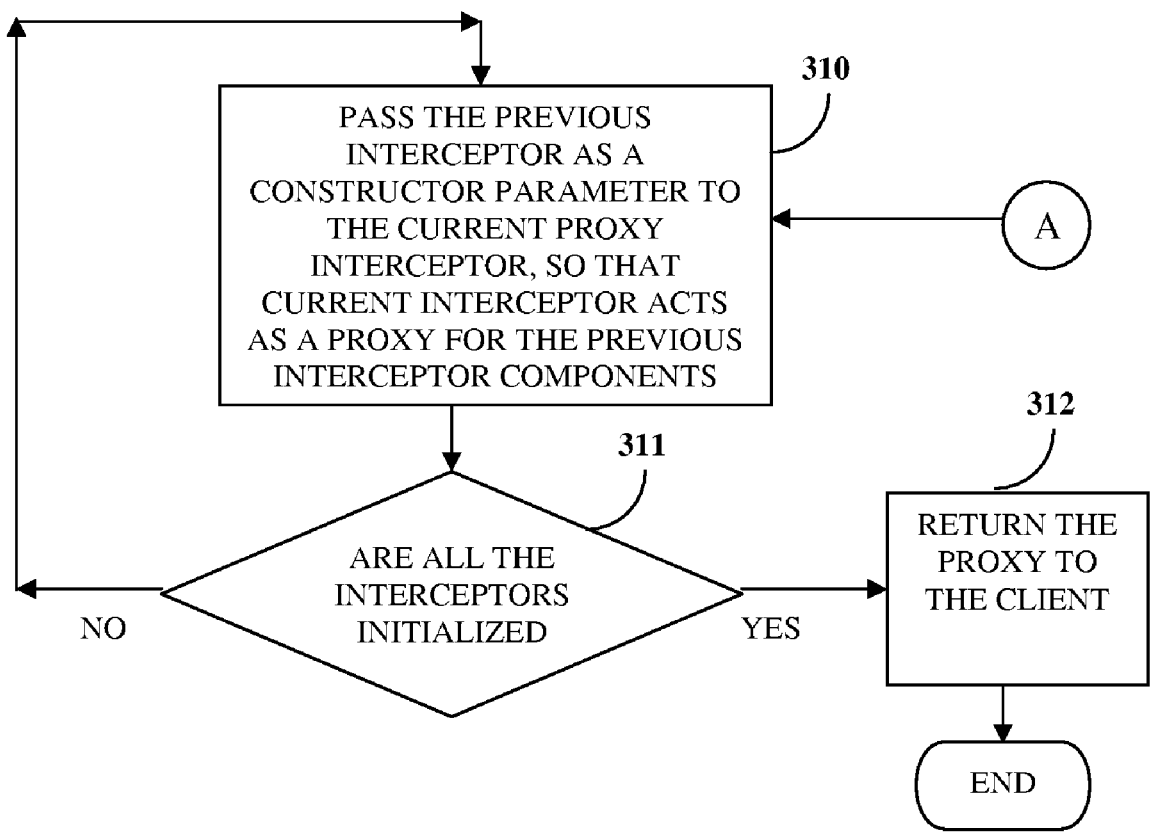
FIG. 3B illustrates a process flow-chart describing the processes involved in initializing the interceptor components.

FIGS. 3A and 3B illustrate a process flow-chart describing the processes involved in initializing the interceptors. When a client program is executed, based on the client program, the requirements of a proxy interceptor are determined. The client program invokes 301 a custom proxy factory to obtain the reference of the business component. The custom proxy factory initializes the business component and passes 302 the instance to the parent base proxy factory class to return the proxy instance by calling getInstance method. The getInstance method declaration is provided below. According to the requirements for a proxy interceptor, the XML configuration file 201 is preconfigured, and this configured file 201 is read and parsed 303. The errors 304 that may occur are proactively determined during the reading and parsing of the XML configuration file 201. If errors 304 occur during parsing or reading of the XML configuration file 201, the process is terminated 305 with appropriate error messages. The errors 304 that may occur are listed below:

1. The XML configuration file 201, i.e. PROXY-FACTORY-CONFIG.XML file may be corrupted. In this case the configuration factory would not be able to read the interceptors and the interceptor chain will not be created.

2. The factory class may not be available in the class path; in that case the factory instance would not be created.

3. Individual interceptor classes may not be in the class path; in that case, the corresponding interceptor would not be initialized.

If no errors are detected, the custom factory class name is read from the XML configuration file 201 and the custom factory class is loaded 306. All the interceptor class names in the XML configuration file are read, parsed and loaded 307 in a map. When the client program invokes a business method, the classes corresponding to the class names listed in the map are read 308 from the loaded factory class. The first interceptor component is initialized 309 as a proxy by passing the constructor of the business component 203 to the base proxy factory class. A chain of interceptor components is created, wherein the constructor parameter of a previous interceptor component is passed 310 to a current interceptor component. As a result the current interceptor acts as a proxy for the previous interceptor components 204. If all the interceptors are initialized 311 by the interceptor framework 202 according to the needs based on the client program execution, the proxy generated that is the final interceptor component in the chain is returned 312 to the client.

The interceptor components 204 are portable and reusable. For example 'access control check' could be written as an interceptor component 204 and the same component could be used across different business functions. The interceptor components 204 may be reconfigured by reconfiguring the entries of the interceptor classes in the XML configuration file 201. The configuration factory now initializes the reconfigured interceptor component 204, when a client program executes. For example, an interceptor component may be removed from a business component 203 without modifying the business component 203. The removal of the interceptor component is determined by the PROXY-FACTORY-CONFIG.XML file. If the entry of an interceptor class is removed from the XML configuration file 201, the configuration factory would not initialize the corresponding interceptor.

A utility called "schema2beans" is software that takes descriptions of XML files in document type definitions (DTDs) or XML Schemas and generates java beans to automatically deal with the XML. Details of this utility package are available at http://schema2beans.netbeans.org/docs.html. The "schema2beans" utility is used by the interceptor framework 202 to read the configuration details specified in the XML configuration file 201, i.e. the proxy-factory-config.XML file. The bean classes are packaged in the package 'com.ketera.invoice.service.proxy.config.beans' in the interceptor framework 202. The framework is initialized in the 'com.ketera.invoice.service.proxy.BaseProxyFactory' class.

The method 'public static Object getInstance(Object myobj, String factoryClassName) throws InvoiceBusiness Exception' in the BaseProxyFactory class implements the logic for initializing the wrapper/interceptor/adapter classes.

Figure 4:
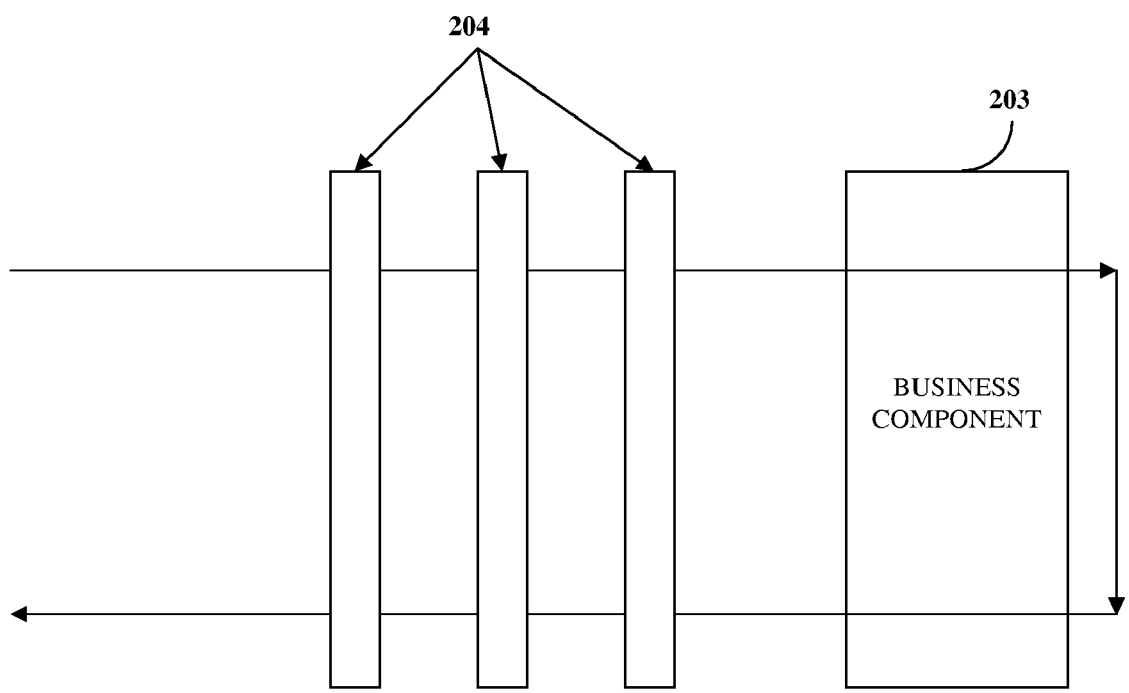
FIG. 4 exemplarily illustrates proxy interceptors attached to a business component.

FIG. 4 exemplarily illustrates proxy interceptor components 204 attached to a business component 203. Using the interceptor framework 202, a set of java wrapper classes or adapters or interceptor classes could be automatically initialized over a business component 203 in a plug and play mode. For example, access control logic or system functionality may be developed as an interceptor component 204 and the interceptor component may be configured to intercept all the calls to the underlying business component 203. The same business component 203 when deployed in a unit testing environment does not require the access control check functionality. Consequently, the access control interceptor may be removed by removing the corresponding interceptor class from the XML configuration file 201. Thus, the technique removes the dependency and necessity to alter the business component 203 for different environments. Interceptor components 204 may be used with different business components 203, thereby resulting in portability and reusability of the interceptor components 204. For example, the 'access control check' system functionality may be written as an interceptor component 204 and used across different business functions.

Another example of a system functionality developed using the interceptor framework 202 is an "invoice management system". The invoice management system receives invoices as commerce extensible markup language (cXML) documents from external systems. Several validation checks are performed on the documents before the documents are approved by the system. These validation checks are organized as wrapper classes/interceptors. The main business logic is isolated from the validation checks by saving these documents as relational entities in the database. The validation wrappers are organized using the interceptor framework 202. The proxy functionality of the interceptor components 204 is achieved by passing a constructor as a parameter, from the previous interceptor to a subsequent interceptor.

FIG. 5 illustrates an exemplary API to configure the wrapper/interceptor classes in the framework. The framework reads the list of wrapper/interceptor/adapter classes and other configuration details from the xml document 'proxy-factory-config.xml 201' using the utility package "schema2beans". The wrapper/interceptor/adapter classes are configured as illustrated in the API of FIG. 5.

The interceptor framework is constituted by three main components as follows:

1. XML Configuration file 201: This xml file is used by the interceptor framework 202 to initialize all the client proxy factories and to associate the client proxy factories' handlers. The interceptor framework 202 reads from this XML configuration file 201 and initializes the proxy chain and associates the chain with the business component.

2. Base proxy factory: The base proxy factory component is the main component in the interceptor framework 202. The base proxy factory component reads the XML configuration file 201 and initializes the proxy chain for each of the custom proxy factories. All custom proxy factory components extend the base proxy factory component and inherit the base proxy factory's proxy handler initialization function.

3. Base proxy handler: This component provides the interface methods that are invoked when a business component is invoked by a client. The base proxy handler has two exposed methods, preInvoke that is invoked before the business method is called; and postInvoke that is called after the business method invocation is completed.

An example of how a client uses the interceptor framework is described as follows.

Step 1: A custom factory class and a set of invocation handlers or listeners or interceptors is defined in the XML configuration file as shown in the example of FIG. 5. In this example 'invocation-handler-factory-class-name' element holds the custom factory class name. The fully qualified name of the custom factory is com.ketera.invoice.service.proxy.factory.RemitRecordProxyFactory.

The element 'invocation-handler-list' holds the list of invocation handlers or listeners or interceptors. The name of the fully qualified class names are defined inside element 'invocation-handler\invocation-handler-class-name'. In the example of FIG. 5 the class names of the handlers are:
"com.ketera.invoice.service.remit.handler.record.RemitRecordValidationHandler",
"com.ketera.invoice.service.remit.handler.record.RemitRecordPopulationHandler", and
"com.ketera.invoice.service.remit.handler.record.RemitRecordEmailHandler"
The first step of the interceptor framework 202 is to configure the proxy factory class and the handler classes in the XML configuration file 201 as mentioned above.

Step 2: A custom factory component defined in the XML configuration file 201 is created, by extending the base proxy factory component. In this custom factory instantiate the business component that is going to be called by the client program. The getInstance method defined in the base proxy factory class is called to initialize the interceptor chain by passing the following parameters, Business component instance: this parameter is used to create the proxy chain and the business component is attached at the end of the chain.

Fully qualified name of the custom factory class name: This name will be configured in the XML configuration file 201. The base factory class would read the invocation handlers configured for the factory and initializes them.

Step 3: The invocation handlers defined in the configuration xml are created. The invocation handlers need to extend the base handler class and implement the abstract methods defined in the abstract methods 'protected abstract void preInvoke(Object proxy, Method method, Object[ ] args) throws InvoiceBusinessException' and 'protected abstract void postInvoke(Object proxy, Method method, Object[ ] args) throws InvoiceBusinessException'.

The preInvoke method is called before the business method of the business component is invoked. The postInvoke method is called after the business method of the business component is invoked.

Step 4: The proxy factory is instantiated from the client program by invoking the getInstance method described in Step 2. The getInstance method would return the business component as proxy to the calling client program. When the client invokes any method in the proxy component, the proxy delegates calls to all the interceptors/handler before calling the business method.

FIG. 6 illustrates an exemplary API for obtaining proxy reference to the business component 203. The proxy instance of the business component 203 is obtained from a base factory class 'com.ketera.invoice.service.proxy.BaseProxyFactory'

FIG. 7 illustrates an exemplary API for initializing a business component from a factory that extends from the 'com.ketera.invoice.service.proxy.BaseProxyFactory' class. An external class could obtain a reference to the proxy service as follows:

```
try{
    InvoiceProxyService proxy =
InvoiceProxyFactory.getInvoiceProxyService( );
        proxy.createInvoice(session, invoiceCtx);
}catch(Exception e){
    log.error(e);
    throw new InvoiceBusinessException(e.getMessage( ));
}
```

It will be readily apparent that the various methods and algorithms described herein may be implemented in a computer readable medium, e.g., appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hardwired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors, or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable storage media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method of isolating a business logic from system operations, comprising the steps of:
    attaching and organizing interceptor components around a business component, comprising the steps of:
        configuring an arrangement of said interceptor components by pre-configuring a set of interceptor classes in a configuration file;
        providing an interceptor framework, wherein said interceptor framework configures, initializes, and maintains said interceptor classes;
        creating and returning a business proxy component to a calling client program;
        parsing said configuration file by the interceptor framework for initializing the interceptor classes; and
        creating an interceptor chain associated with said business component when said client program invokes methods on said business proxy component, wherein each interceptor component in said interceptor chain acts as a proxy to a previous interceptor component;
    whereby the business component implements said business logic and the interceptor components perform said system operations separately using a server system environment; and whereby the business logic is isolated from the system operations.

2. The method of claim 1, wherein a set of java interceptor classes is automatically initialized over the business component using the interceptor framework, wherein said step of initialization is in a plug and play mode.

3. The method of claim 1, wherein the step of proxy interceptor components isolating the business logic from the system operations comprises maintaining transaction integrity, authentication and performance matrix calculation.

4. The method of claim 1, wherein the interceptor components are interposed between the client program and the business component.

5. The method of claim 1, further comprising an abstract base class that defines the behavior of the interceptor classes.

6. The method of claim 1, wherein said step of attaching the interceptor components around the business component allows the business component to be independent of said server system environment.

7. The method of claim 1, wherein when the client program executes any of the exposed methods on an interface published by the business component, the interceptor framework delegates method calls to the interceptor classes preconfigured in the configuration file.

8. The method of claim 7, wherein the interceptor components are dynamically generated when the client program invokes a business method.

9. The method of claim 1, wherein a constructor from the previous interceptor component is passed as a parameter to a current interceptor component, whereby said current interceptor component acts as a proxy for previous interceptor component.

10. The method of claim 1, wherein the interceptor framework that organizes the proxy interceptors is deployed in a Java virtual machine or any virtual machine that supports generation of dynamic proxies.

11. A computer program product comprising computer executable instructions embodied in a computer-readable storage medium, said computer program product including:
- a first computer parsable program code for attaching and organizing interceptor components around a business component further comprising:
- a second computer parsable program code for configuring said interceptor components by pre-configuring a set of interceptor classes in a configuration file;
- a third computer parsable program code of an interceptor framework, wherein said interceptor framework configures, initializes, and maintains said interceptor classes;
- a fourth computer parsable program code for creating and returning a business proxy component to a calling client program; and
- a fifth computer parsable program code for creating an interceptor chain associated with said business component when said client program invokes methods on said business proxy component, wherein each interceptor component in said interceptor chain acts as a proxy to a previous interceptor component;
- whereby the business component implements said business logic and the interceptor components perform said system operations separately using a server system environment;
- and whereby the business logic is isolated from the system operations.

* * * * *